United States Patent
Okumura et al.

(10) Patent No.: US 12,025,110 B2
(45) Date of Patent: Jul. 2, 2024

(54) CHARGING MITIGATION DEVICE AND ELECTRIC DISCHARGE AVOIDANCE METHOD

(71) Applicant: Japan Aerospace Exploration Agency, Chofu (JP)

(72) Inventors: Teppei Okumura, Chofu (JP); Shinatora Cho, Chofu (JP); Yasushi Ohkawa, Chofu (JP); Hiroyuki Okamoto, Chofu (JP)

(73) Assignee: JAPAN AEROSPACE EXPLORATION AGENCY (JP)

( * ) Notice: Subject to any disclaimer, the term of this patent is extended or adjusted under 35 U.S.C. 154(b) by 0 days.

(21) Appl. No.: 18/097,673

(22) Filed: Jan. 17, 2023

(65) Prior Publication Data
US 2023/0349369 A1 Nov. 2, 2023

(30) Foreign Application Priority Data
Apr. 28, 2022 (JP) .................. 2022-074195

(51) Int. Cl.
*F03H 1/00* (2006.01)
*B64G 1/40* (2006.01)

(52) U.S. Cl.
CPC ............. *F03H 1/0087* (2013.01); *B64G 1/40* (2013.01); *F03H 1/0025* (2013.01)

(58) Field of Classification Search
CPC ........ F03H 1/00; F03H 1/0025; F03H 1/0081; F03H 1/0087; F03H 1/0093; B64G 1/40; B64G 1/405; B64G 1/52; B64G 1/646; B64D 45/02; H05H 2245/00; H05H 2245/40; H05H 2245/50; H05H 2245/60; H05H 2277/00; H05H 2277/14;
(Continued)

(56) References Cited

U.S. PATENT DOCUMENTS

| 7,637,461 B1 | 12/2009 | Spanjers .................... 244/171.7 |
| 9,119,277 B2 | 8/2015 | Canham |
| 2011/0036951 A1 | 2/2011 | Moorer et al. ............. 244/158.6 |

(Continued)

FOREIGN PATENT DOCUMENTS

| JP | 2020-516524 A | 6/2020 |
| WO | WO 2018/190943 A1 | 10/2018 |

OTHER PUBLICATIONS

Hani Kamhawi, John T. Yim, Michael J. Patterson, and Penni J. Dalton, "Operational Status of the International Space Station Plasma Contactor Hollow Cathode Assemblies" Jul. 2001 to May 2013, [online], Jul. 15, 2013, NASA Technical Reports Server (NTRS), [retrieved on Jul. 13, 2021], <URL:https://ntrs.nasa.gov/citations/20140009580>.

(Continued)

*Primary Examiner* — Loren C Edwards
(74) *Attorney, Agent, or Firm* — OSTROLENK FABER LLP

(57) ABSTRACT

A structure for preventing an electric discharge between devices without any need for a dedicated device when mounted on an artificial satellite is provided. A charging mitigation device for reducing a potential difference between two or more physical objects includes an electric thruster (100) configured to generate plasma (PL), wherein the two or more physical objects are covered with the plasma (PL) generated from the electric thruster (100).

8 Claims, 4 Drawing Sheets

(58) Field of Classification Search
CPC ..... H05F 1/00; H05F 1/02; H05F 3/00; H05F 3/04; H05F 3/06
See application file for complete search history.

(56) References Cited

U.S. PATENT DOCUMENTS

2018/0297722 A1    10/2018  Agathon-Burton et al.
2021/0031951 A1*    2/2021  Agathon-Burton .... B64G 1/405

OTHER PUBLICATIONS

Combined Search and Examination Report dated Jun. 29, 2023, issued in corresponding GB Patent Application No. GB2300565.5.
Office Action dated Feb. 6, 2024, issued in corresponding Japanese Patent Application No. 2022-074195 with English translation.

* cited by examiner

CHARGING MITIGATION DEVICE AND ELECTRIC DISCHARGE AVOIDANCE METHOD

BACKGROUND OF THE INVENTION

Field of the Invention

The present invention relates to a charging mitigation device and an electric discharge avoidance method.

Priority is claimed on Japanese Patent Application No. 2022-074195, filed Apr. 28, 2022, the content of which is incorporated herein by reference.

DESCRIPTION OF RELATED ART

In satellite missions such as debris removal and on-orbit services, docking operations between debris and artificial satellites or between artificial satellites are performed. In these instances, a potential difference may occur between the docking artificial satellites. If this potential difference causes an electric discharge between the artificial satellites, it becomes a factor that adversely affects a device of the artificial satellite.

As a countermeasure, technology for avoiding an electric discharge by mounting a plasma generation device on the International Space Station and generating plasma from a device at the time of docking has been disclosed (for example, Non-Patent Document 1).

Also, technology for preventing the occurrence of an electric discharge by providing a function of generating plasma in a docking portion of an artificial satellite and generating plasma around a contact portion between artificial satellites has been disclosed (for example, Patent Document 1).

PATENT DOCUMENTS

[Patent Document 1] U.S. Pat. No. 9,119,277

Non-Patent Documents

[Non-Patent Document 1] Hani Kamhawi, John T. Yim, Michael J. Patterson, and Penni J. Dalton, 'Operational Status of the International Space Station Plasma Contactor Hollow Cathode Assemblies July 2001 to May 2013,' [online], Jul. 15, 2013, NASA Technical Reports Server (NTRS), [retrieved on 13 Jul. 2021], <URL:https://ntrs.nasa.gov/citations/20140009580>

SUMMARY OF THE INVENTION

In the related art described above, a charging mitigation device is configured by providing a dedicated device. In artificial satellites, it is necessary to reduce a resource load such as power or mass. Although the charging mitigation device is a device mainly used only during docking, there is a problem that power consumption and mass increase when a dedicated charging mitigation device is mounted on the artificial satellite.

The present invention has been made in view of the above-described circumstances and an objective thereof is to provide a structure for preventing an electric discharge between devices without any need for a dedicated device when mounted on an artificial satellite.

<1> According to an aspect of the present invention, there is provided a charging mitigation device for reducing a potential difference between two or more physical objects, the charging mitigation device including: an electric thruster configured to generate plasma, wherein the two or more physical objects are covered with the plasma generated from the electric thruster.

The two or more physical objects are covered with the plasma generated from the electric thruster. That is, the electric thruster is used as a charging mitigation device. Thereby, when this charging mitigation device is mounted on the artificial satellite, it is not necessary to provide a dedicated device separately. Consequently, it is possible to save power resources in artificial satellites, avoid an increase in mass, and simplify an anti-charging design in the artificial satellites.

<2> In the charging mitigation device according to the above-described <1>, a configuration in which the electric thruster is a Hall thruster, the Hall thruster includes a cathode electrode, a keeper electrode, and an anode electrode, the Hall thruster is able to switch a mode between a thrust generation mode in which thrust is generated and a charging mitigation mode in which the two or more physical objects are covered with the plasma, in the thrust generation mode, after the plasma is ignited by applying a voltage between the keeper electrode and the cathode electrode, the plasma is generated from the Hall thruster in a state in which the application of the voltage between the cathode electrode and the keeper electrode is stopped while the voltage is applied between the anode electrode and the cathode electrode, and in the charging mitigation mode, the plasma is generated from the Hall thruster in a state in which no voltage is applied between the anode electrode and the cathode electrode and the voltage is continuously applied between the keeper electrode and the cathode electrode may be adopted.

In the charging mitigation mode, the plasma is generated from the Hall thruster in a state in which no voltage is applied between the anode electrode and the cathode electrode and the voltage is continuously applied between the keeper electrode and the cathode electrode. Thereby, the power in the charging mitigation mode can be minimized as necessary and the generation of the thrust can be suppressed.

<3> In the charging mitigation device according to the above-described <2>, a configuration in which, in the charging mitigation mode, the Hall thruster is controlled on the basis of the potential difference between the two or more physical objects may be adopted.

In the charging mitigation mode, the Hall thruster is controlled on the basis of the potential difference between the two or more physical objects. Thereby, the plasma can be appropriately generated from the Hall thruster on the basis of the potential difference between the two or more physical objects.

<4> In the charging mitigation device according to the above-described <2> or <3>, a configuration in which, in the charging mitigation mode, a magnetic field is applied to the Hall thruster while the voltage is applied between the cathode electrode and the keeper electrode may be adopted.

In the charging mitigation mode, the magnetic field is applied to the Hall thruster while the voltage is applied between the cathode electrode and the keeper electrode. Thereby, the plasma can be generated more efficiently.

<5> A configuration in which the charging mitigation device according to any one of the above-described <2> to <4> further includes a first gas supply unit configured to supply working gas to the Hall thruster at the time of the ignition of the plasma in the thrust generation mode; and a second gas supply unit configured to supply working gas to the Hall thruster at the time of the generation of the thrust based on the plasma in the thrust generation mode, wherein, in the charging mitigation mode, the working gas is supplied from the first gas supply unit to the Hall thruster, may be adopted.

In the charging mitigation mode, the working gas is supplied from the first gas supply unit to the Hall thruster. Thereby, for example, by increasing a flow rate of the working gas from the first gas supply pipe, the density of the plasma generated by the cathode electrode can be improved or the generation of charge exchange ions can be promoted.

<6> In the charging mitigation device according to the above-described <5>, a configuration in which, in the charging mitigation mode, the working gas is supplied from both the first gas supply unit and the second gas supply unit to the Hall thruster in parallel may be adopted.

In the charging mitigation mode, the working gas is supplied from both the first gas supply unit and the second gas supply unit to the Hall thruster in parallel. Thereby, the plasma can be generated more efficiently.

<7> In the charging mitigation device according to any one of the above-described <1> to <6>, a configuration in which one of the two or more physical objects is an artificial satellite on which the electric thruster is mounted may be adopted.

The electric thruster is mounted on the artificial satellite. Here, because the plasma diffuses heat, a position where the electric thruster is mounted on the artificial satellite is not considered and the direction and position of the electric thruster are not restricted.

<8> According to an aspect of the present invention, there is provided an electric discharge avoidance method of avoiding an electric discharge due to a potential difference between two or more physical objects, the method including: using the charging mitigation device according to any one of the above-described <1> to <7> and covering the two or more physical objects with the plasma generated from the electric thruster.

According to the present invention, it is possible to prevent an electric discharge between devices without any need for a dedicated device when a structure is mounted on an artificial satellite.

DETAILED DESCRIPTION OF THE INVENTION

Figure 1:
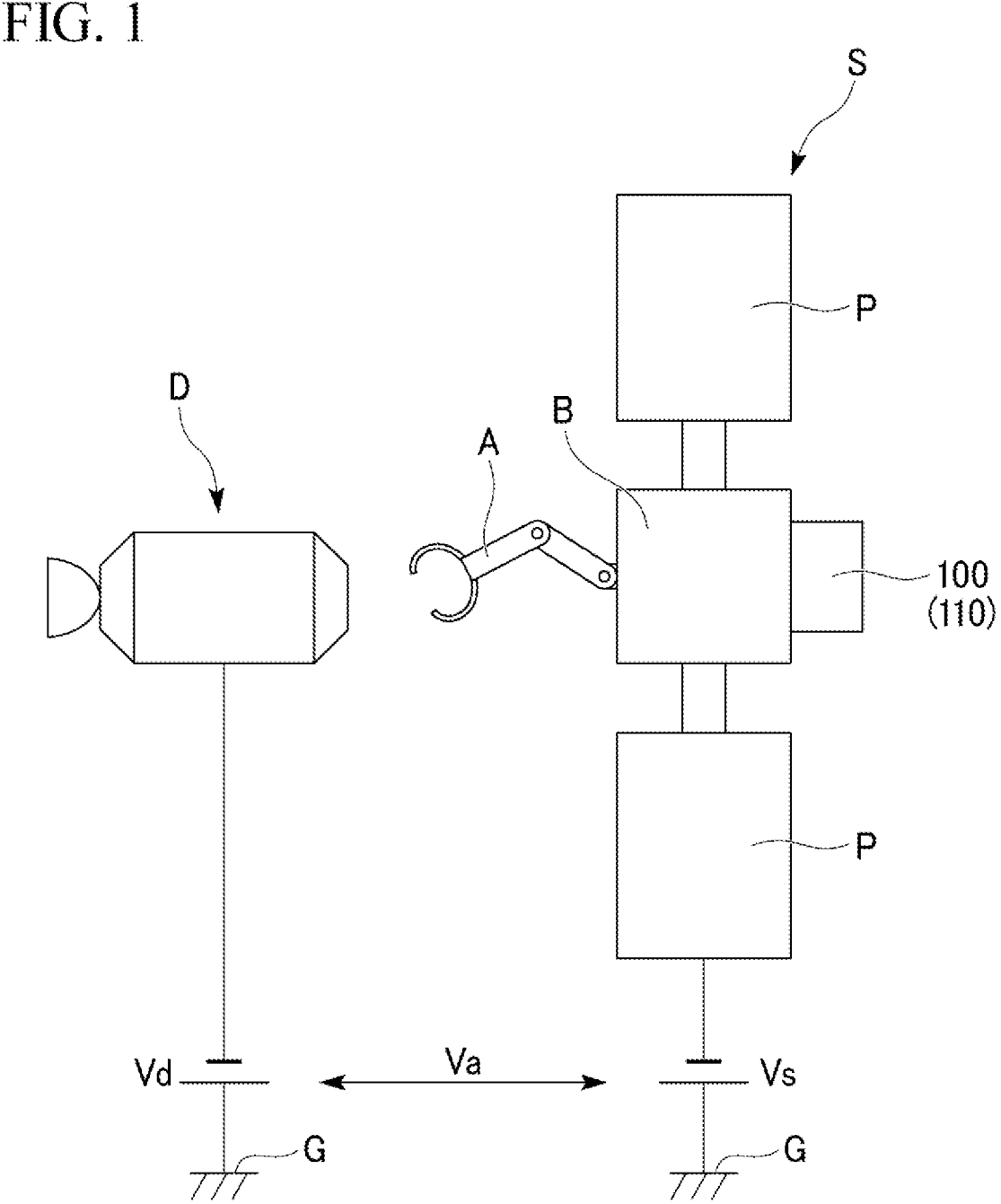
FIG. 1 is a diagram showing an artificial satellite on which a charging mitigation device is mounted according to an embodiment of the present invention.

Hereinafter, a charging mitigation device 110 according to an embodiment of the present invention will be described with reference to FIGS. 1 to 4. As shown in FIG. 1, the charging mitigation device 110 according to the present embodiment is mounted on, for example, an artificial satellite S.

(Artificial Satellite)

The artificial satellite S includes a main body B, a solar panel P, a robot arm A, and a Hall thruster 100. The solar panel P, the robot arm A, and the Hall thruster 100 are each installed in the main body B. The artificial satellite S is operated, for example, by the solar panel P. The robot arm A is used to dock a target object D floating in outer space G with the artificial satellite S.

(Hall Thruster)

The Hall thruster 100 functions as a thrust generation device (an electric thruster) that injects plasma PL and is responsible for the thrust of the artificial satellite S. The artificial satellite S uses this thrust to move in the outer space G and control its attitude. Also, when the Hall thruster 100 generates the thrust, the direction in which the plasma PL (ions) is injected from the Hall thruster 100 is referred to as an injection direction J. The Hall thruster 100 generates the thrust by the reaction generated during the injection of the plasma PL.

Figure 2:
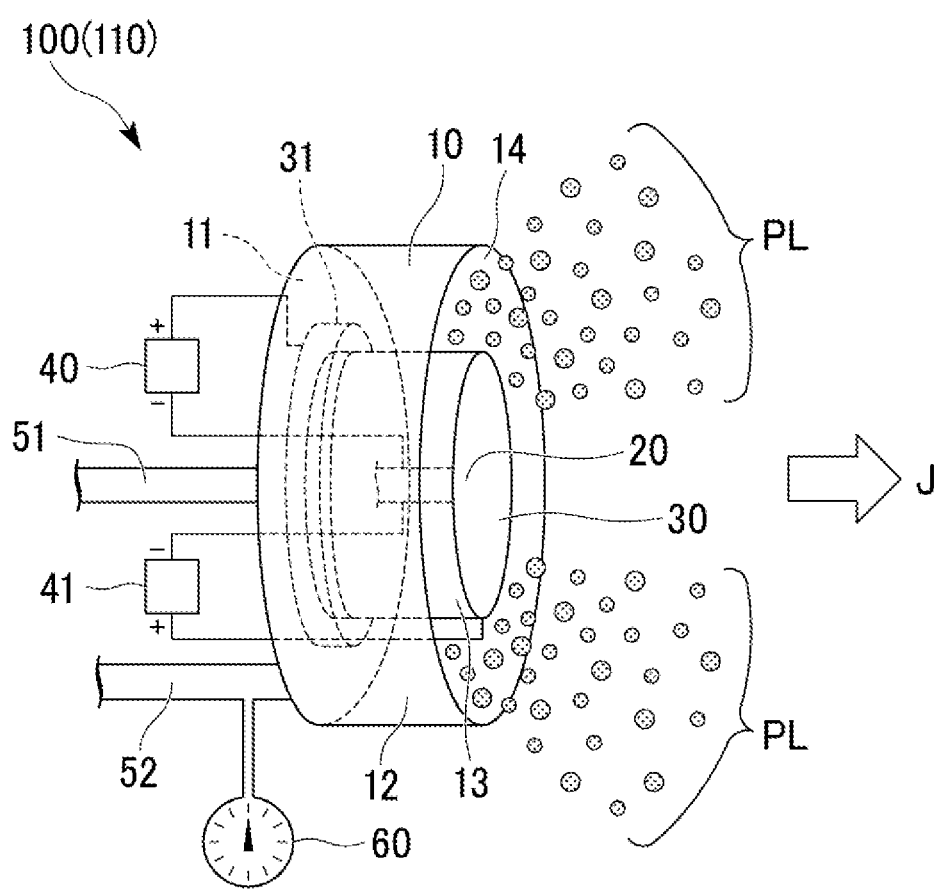
FIG. 2 is an enlarged view of a Hall thruster constituting the charging mitigation device shown in FIG. 1.
Figure 3:
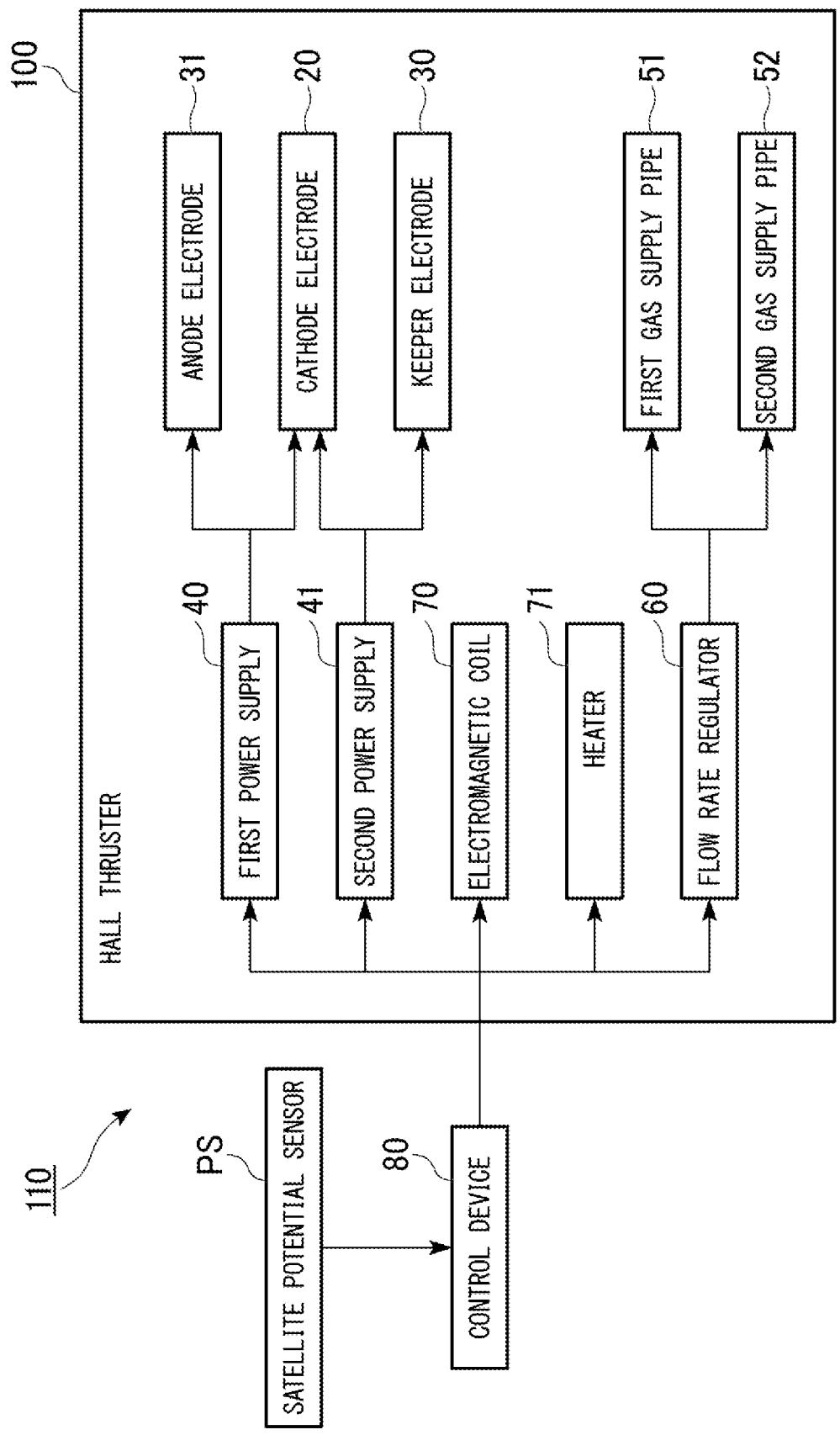
FIG. 3 is a control block diagram of the charging mitigation device shown in FIG. 1.

As shown in FIGS. 2 and 3, the Hall thruster 100 includes a thruster head 10, an anode electrode 31, a cathode electrode 20, a keeper electrode 30, a first power supply 40, a second power supply 41, an electromagnetic coil 70, a heater 71, a first gas supply pipe 51, a second gas supply pipe 52, a flow rate regulator 60, and a control device 80.

The thruster head 10 includes a bottom portion 11, an outer peripheral portion 12, and a central portion 13. The bottom portion 11 is a portion closest to the main body B within the thruster head 10. The outer peripheral portion 12 and the central portion 13 extend from the bottom portion 11 in the injection direction J. The outer peripheral portion 12 constitutes the outer periphery of the thruster head 10. The outer peripheral portion 12 is tubular. The central portion 13 is located internally in the radial direction of the outer peripheral portion 12 with respect to the outer peripheral portion 12. The central portion 13 is located at the center of the outer peripheral portion 12 in the radial direction.

An annular channel 14 (a groove) that opens in the injection direction J is provided in the thruster head 10. The channel 14 is formed by the bottom portion 11, the outer peripheral portion 12, and the central portion 13. The plasma PL is injected from the channel 14 in the injection direction J.

In the channel 14, an electric field from the bottom portion 11 in the injection direction J (an axial direction of the thruster head 10) and a magnetic field from the outer peripheral portion 12 to the central portion 13 (a radial direction of the thruster head 10) are generated. The electric field and the magnetic field generate a Hall current within the channel 14.

The anode electrode 31, the cathode electrode 20, and the keeper electrode 30 are electrically isolated from each other. The first power supply 40 is connected between the anode electrode 31 and the cathode electrode 20. The second power supply 41 is connected between the cathode electrode 20 and the keeper electrode 30. As a result, an electric discharge can be enabled between the anode electrode 31 and the cathode electrode 20 and an electric discharge can be enabled between the cathode electrode 20 and the keeper electrode 30.

Also, a maximum voltage of the first power supply 40 may be, for example, 1 kV. A positive electrode of the first power supply 40 is connected to the anode electrode 31. A negative electrode of the first power supply 40 is connected to the cathode electrode 20.

The capacitance of the second power supply 41 may be less than that of the first power supply 40. A maximum voltage of the second power supply 41 may be, for example, 300 V. A positive electrode of the second power supply 41 is connected to the keeper electrode 30. A negative electrode of the second power supply 41 is connected to the cathode electrode 20.

For example, electric power generated by the solar panel P is supplied to the first power supply 40 and the second power supply 41.

The anode electrode 31 is disposed at the bottom portion 11 of the thruster head 10. The cathode electrode 20 and the keeper electrode 30 are electrically isolated from each other and are disposed on the central portion 13 of the thruster head 10.

The anode electrode 31 and the cathode electrode 20 generate the electric field within the channel 14. The anode electrode 31 is an anode of the electric field. The cathode electrode 20 is a cathode of the electric field.

In addition to the role of generating the electric field, the cathode electrode 20 also has the role of supplying electrons to the plasma PL injected from the channel 14. The plasma PL is electrically neutralized by supplying electrons from the cathode electrode 20. The cathode electrode 20 can be appropriately modified in another form in which these roles can be achieved.

The Hall thruster according to the present embodiment is a so-called center cathode Hall thruster in which the cathode electrode 20 is disposed on the central portion 13 of the thruster head 10. However, it is also possible to adopt a configuration in which the cathode electrode 20 is located outside of the thruster head 10. However, in the center cathode Hall thruster as shown in FIG. 2, as will be described below, because the working gas is supplied to the channel 14 physically located close to the cathode electrode 20, there is an advantage that plasma PL having low power and high density is likely to be generated.

The electromagnetic coil 70 generates the magnetic field within the channel 14. For example, the electromagnetic coil 70 is disposed on the thruster head 10. The electromagnetic coil 70 is disposed on the central portion 13 of the thruster head 10.

The heater 71 heats the cathode electrode 20 (a thermionic emission material).

The first gas supply pipe 51 and the second gas supply pipe 52 supply working gas serving as the plasma PL to the thruster head 10. For example, a gas tank (not shown) containing the working gas is connected to the first gas supply pipe 51 and the second gas supply pipe 52. For the working gas, for example, xenon gas is applied. The first gas supply pipe 51 is used to ignite the plasma PL when the Hall thruster 100 is activated. The second gas supply pipe 52 is used to generate thrust by the plasma PL after the Hall thruster 100 is activated.

The first gas supply pipe 51 supplies the working gas to the thruster head 10 so that electrons during an electric discharge between the cathode electrode 20 and the keeper electrode 30 are supplied.

The second gas supply pipe 52 supplies working gas to the thruster head 10 so that electrons during an electric discharge between the cathode electrode 20 and the anode electrode 31 are supplied. The second gas supply pipe 52 supplies the working gas from the bottom portion 11 into the channel 14 in the injection direction J.

Also, arrangements and shapes of the anode electrode 31, the cathode electrode 20, the keeper electrode 30, the first gas supply pipe 51, and the second gas supply pipe 52 can be appropriately set in accordance with, for example, the relative relationship between the electrodes 31, 20, and 30 and the supply pipes 51 and 52.

A flow rate regulator 60 is provided in the first gas supply pipe 51 and the second gas supply pipe 52. The flow rate regulator 60 controls a flow rate of the working gas in the first gas supply pipe 51 and the second gas supply pipe 52. The flow rate regulator 60 includes, for example, an electromagnetic valve and the like.

The control device 80 controls each of the above-described components. Examples of the control device 80 include a computer and the like. For example, the control device 80 controls each of the first power supply 40, the second power supply 41, the electromagnetic coil 70, the heater 71, and the flow rate regulator 60. The control device 80 is operated by, for example, power supply from the solar panel P. The control device 80 may also be used as a control device for the entire artificial satellite S.

(Normal Operation of Hall Thruster (Thrust Generation Mode))

When thrust is generated in the artificial satellite S, the Hall thruster 100 operates, for example, as in the following procedures <1> to <4>. Each of these procedures is performed, for example, by the control device. The following procedures are examples and the present invention is not limited to these procedures. Each of these procedures is controlled by the control device 80.

<1> First, in the present embodiment, the heater 71 heats the cathode electrode 20 (a thermionic emission material). A target temperature of the cathode electrode 20 is, for example, about 1000° C. to 1600° C. The target temperature of the cathode electrode 20 can be measured, for example, by a thermion, a radiation thermometer, or the like. Also, there may be no heating process of the heater 71. In this case, the heater 71 may be absent. Here, for example, if normal temperature ignition of the plasma PL can be implemented, the heating process of the heater 71 can be omitted. The normal temperature ignition can be implemented, for example, by devising a shape of the cathode electrode 20 or applying a high voltage between the cathode electrode 20 and the keeper electrode 30.

<2> After the cathode electrode 20 is heated to a target temperature, the following (a) to (d) are performed.
  (a) The first gas supply pipe 51 supplies the working gas to the thruster head 10.
  (b) The second power supply 41 applies a voltage between the keeper electrode 30 and the cathode electrode 20. As a result, an electric discharge occurs between the keeper electrode 30 and the cathode electrode 20.
  (c) The second gas supply pipe 52 supplies the working gas to the thruster head 10.
  (d) The electromagnetic coil 70 is activated. As a result, a magnetic field is generated within the channel 14.

The order of (a) to (d) can be changed as appropriate. (a) to (d) is performed, for example, sequentially, immediately (e.g., in units of milliseconds).

Because the above (a) and (b) are performed, the working gas from the first gas supply pipe 51 is ignited by an electric discharge between the keeper electrode 30 and the cathode electrode 20 and plasma PL is generated.

<3> After the above (a) to (d) are performed, immediately (for example, in units of milliseconds), the first power supply 40 applies a voltage between the anode electrode 31 and the cathode electrode 20. As a result, an electric discharge occurs between the anode electrode 31 and the cathode electrode 20 and an electric field is generated within the channel 14. Here, by performing the above (d), a magnetic field is generated within the channel 14 and a Hall current is generated within the channel 14 by the magnetic field and the electric field.

A process in which the working gas supplied from the second gas supply pipe 52 into the channel 14 by implementing the above (c) is ionized by the Hall current generated within the channel 14 and the plasma PL generated via (a) and (b) is promoted. Electrons ionized from the working gas flow as the Hall current within the channel 14. Ions (for example, xenon ions) whose electrons are ionized from the working gas move in the injection direction J within the channel 14 and the electrons are supplied from the cathode electrode 20 to the ions. As a result, the plasma PL is injected from the channel 14 in the injection direction J and the thrust is generated.

<4> Subsequently, the application of a voltage between the keeper electrode 30 and the cathode electrode 20 by the second power supply 41 is stopped immediately (e.g., in units of milliseconds). Thereby, the Hall thruster 100 enters a steady thrust generation state.

As described above, the keeper electrode 30 is usually used only as an igniter for starting a process of carrying an electric current to the cathode electrode 20 and is not used during a steady operation. An electric current is carried to the keeper electrode 30 for only about 100 to 1000 milliseconds when the plasma PL is initially generated at the time of activation of the Hall thruster 100. That is, after the second power supply 41 is activated at the time of the above (d), the period of time until thrust is generated and the second power supply 41 stops (up to the above <d>) is about 100 to 1000 milliseconds.

Also, in the above-described Hall thruster 100, in a state in which the plasma PL generated using the keeper electrode 30 is located around the anode electrode 31, a process of carrying an electric current to the anode electrode 31 starts and a process of carrying an electric current to the keeper electrode 30 stops, such that the operation of the Hall thruster 100 is switched to the generation of plasma PL (a main electric discharge) with an amount and a speed for enabling thrust to be generated. Specifically, in a state in which a process in which the first power supply 40 carries an electric current to the anode electrode 31 has started, a voltage from the first power supply 40 to the anode electrode 31 increases or a magnetic field is applied by the electromagnetic coil 70, such that the plasma PL can be discharged at a high speed and the thrust can be obtained. In this way, the Hall thruster 100 operates as a thrust device (a thrust generation mode) of the artificial satellite S.

(Use of Hall Thruster Serving as Charging Mitigation Device (Charging Mitigation Mode))

As shown in FIG. 1, there are a target object potential Vd between the target object D and the outer space G and a satellite potential Vs between the artificial satellite S and the outer space G in the outer space G. When the target object potential Vd and the satellite potential Vs are different, a potential difference Va occurs between the target object potential Vd and the satellite potential Vs. At the time of docking between the target object D and the artificial satellite S, an electric discharge may occur between the target object D and the artificial satellite S (the robot arm A) due to the potential difference Va.

In the present embodiment, the Hall thruster 100 also functions as a charging mitigation device 110 to avoid this electric discharge. The Hall thruster 100 according to the present embodiment is usually used as a thrust generation device and is used as a charging mitigation device at the time of docking between the artificial satellite S and the target object D. In the present embodiment, the Hall thruster 100 also serves as a thrust generation device and a charging mitigation device 110. The mode of the Hall thruster 100 can be switched between a thrust generation mode and a charging mitigation mode.

Also, examples of the target object D include other artificial satellites S and rocket debris that are subject to on-orbit services and the like. Particularly possible places where the target object D and the artificial satellite S dock are, for example, in the aurora oval of a polar orbit, a geostationary orbit, and an intermediate orbit. These places are regions where particularly high-energy electrons are located in the outer space G. The Hall thruster 100 is particularly suitably used as the charging mitigation device 110 at the site described above.

As shown in FIG. 3, the charging mitigation device 110 includes a Hall thruster 100, a control device 80, and a satellite potential sensor PS. The satellite potential sensor PS measures a potential between the artificial satellite S and the outer space G. A measurement result of the satellite potential sensor PS is sent to the control device 80. The control device 80 can estimate a potential difference Va between the artificial satellite S and the target object D on the basis of the measurement result of the satellite potential sensor PS. The control device 80 controls an operation of the Hall thruster 100 on the basis of the measurement result of the satellite potential sensor PS.

(Electric Discharge Avoidance Method)

Figure 4:
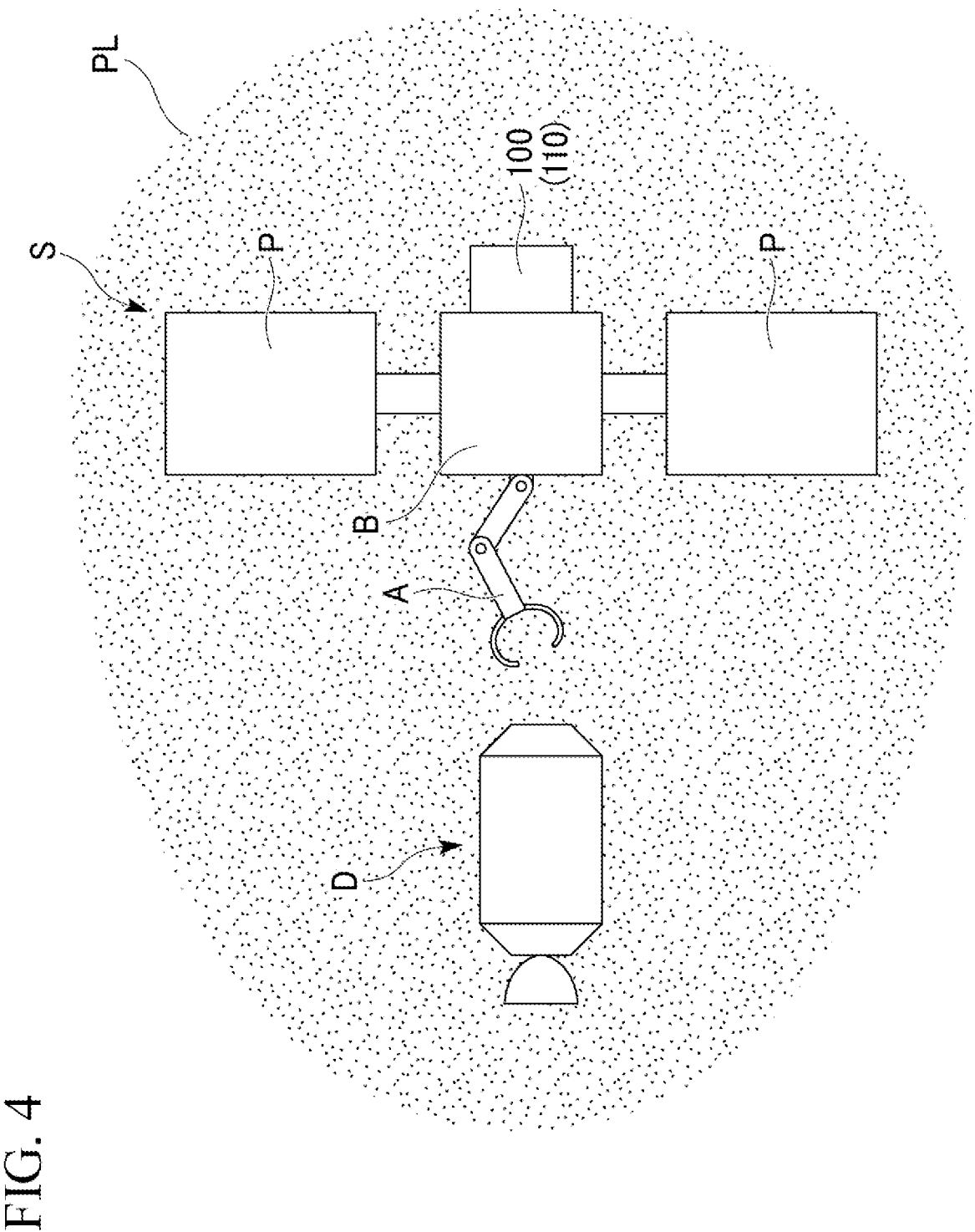
FIG. 4 is a diagram showing a state in which the artificial satellite and a target object are covered with plasma generated by the charging mitigation device shown in FIG. 1.

In the present embodiment, in order to avoid an electric discharge, as shown in FIG. 4, a portion where the robot arm A of the artificial satellite S docks with the target object D is covered with the plasma PL generated by the Hall thruster 100 due to diffusion (thermal diffusion) thereof. Thereby, the charging of the artificial satellite S and the target object D is mitigated and the electric discharge between the artificial satellite S and the target object D is avoided.

Also, in order to avoid the electric discharge, the density of the plasma PL at the portion where the robot arm A docks with the target object D and in the vicinity thereof is preferably $10^{11}/m^3$ or more. In a state in which the robot arm A of the artificial satellite S is maximally expanded and a minimum distance between the tip of the robot arm A and the target object D is 0.01 m, an electric discharge can be avoided more reliably if the density of the plasma PL in a region including all the robot arm A and the target object D becomes the above-described density. Also, docking between the artificial satellite S and the target object D requires about a maximum of about 1.5 hours. For this reason, it is necessary to maintain the density of the plasma PL only for the above period of time.

Even if the plasma PL for the purpose of charging mitigation is generated in the normal operation (thrust generation mode) of the Hall thruster 100 as shown in the above-described <1> to <4>, the generated plasma PL does not stay around the artificial satellite S and the charging mitigation by the plasma PL is difficult. For this reason, in the present embodiment, the plasma PL for the purpose of the charging mitigation is mainly generated in a current-carrying process between the keeper electrode 30 and the cathode electrode 20.

That is, in the present embodiment, a period of time when the current-carrying process is performed between the keeper electrode 30 and the cathode electrode 20 is longer than a period of time when the keeper electrode 30 is used only as an igniter (the charging mitigation mode). As compared with the case where the plasma PL is generated in a current-carrying process between the anode electrode 31 and the cathode electrode 20, the injection speed of the plasma PL is low (low-speed plasma) and does not generate thrust and power consumption is also small (for example, about 1/10 or less).

In the charging mitigation mode, <1> of the above <1> to <4> shown as the thrust generation mode is performed similarly and the cathode electrode 20 is heated. However, <1> is not mandatory. Also, in <1>, the temperature of the target cathode electrode 20 may be different from that during the normal operation.

Also, (a) and (b) are implemented within the above-described <2> and the first gas supply pipe 51 supplies working gas to the thruster head 10 and the second power supply 41 applies a voltage between the keeper electrode 30 and the cathode electrode 20. As a result, plasma PL is generated.

At this time, both (c) and (d) or only one may be further performed. In this case, the second gas supply pipe 52 supplies the working gas within the channel 14 or generates a magnetic field within the channel 14, such that the generation of plasma PL is further promoted.

However, unlike the above-described normal operation, the above-described <3> or <4> is not performed. That is, the application of a voltage between the anode electrode 31 and the cathode electrode 20 or the stop of the application of a voltage between the keeper electrode 30 and the cathode electrode 20 is not performed.

Thus, for the purpose of charging mitigation that does not require thrust (the charging mitigation mode), plasma PL that does not generate thrust by performing a current-carrying process between the keeper electrode 30 and the cathode electrode 20, in other words, plasma PL specialized for charging mitigation, is efficiently generated with low power consumption.

In addition to the current-carrying process between the keeper electrode 30 and the cathode electrode 20, the plasma PL is not discharged at a high speed in an acceleration voltage control process (for example, a process of controlling the voltage applied to the keeper electrode 30 and the cathode electrode 20 or a process of controlling the voltage that is applied to the anode electrode 31 and the cathode electrode 20). Thereby, it is ensured that the plasma PL remains in the vicinity of the Hall thruster 100 and plasma PL is efficiently generated.

At this time, in addition to the operation of the cathode electrode 20 as in the above-described (b) (a current-carrying process between the keeper electrode 30 and the cathode electrode 20), when the application of a magnetic field is added as in the above-described (d), the plasma PL generated by the cathode electrode 20 is rectified. As a result, although no thrust is substantially generated, the plasma PL is expected to be easily diffused not only near but also far away from the Hall thruster 100.

In the charging mitigation mode, the more plasma PL can be generated by injecting the more working gas from the first gas supply pipe 51. Thus, the first gas supply pipe 51 in the present embodiment may have a specification for enabling working gas having a flow rate higher than a flow rate when it is simply used to ignite the plasma PL to flow.

In the present embodiment, the working gas is supplied from the first gas supply pipe 51 or the second gas supply pipe 52 that is a component of the Hall thruster 100 to the thruster head 10. In order to generate and diffuse the more plasma PL, in addition to this, the working gas may be supplied from another gas supply pipe or a chemical thruster separate from the Hall thruster 100 to the thruster head 10. For example, when two or more Hall thrusters 100 are mounted on the artificial satellite S and one Hall thruster 100 is defective in a system other than a system that supplies the working gas, only the working gas is injected from the defective Hall thruster 100 and the generation and diffusion of plasma PL in the non-defective Hall thruster 100 may be promoted.

As described above, in the charging mitigation device 110 according to the present embodiment, two or more physical objects (a target object D and an artificial satellite S) are covered with plasma PL generated from the Hall thruster 100. That is, the Hall thruster 100 used as the electric thruster is used as the charging mitigation device 110. Thereby, when the charging mitigation device 110 is mounted on the artificial satellite S, it is not necessary to provide a dedicated device separately. Consequently, it is possible to save power resources in the artificial satellite S, avoid an increase in mass, and simplify an anti-charging design in the artificial satellite S.

In the charging mitigation mode, plasma PL is generated from the Hall thruster 100 in a state in which no voltage is applied between the anode electrode 31 and the cathode electrode 20 and a voltage is continuously applied between the keeper electrode 30 and the cathode electrode 20. Thereby, the power in the charging mitigation mode can be minimized as necessary and the generation of thrust can be suppressed.

In the charging mitigation mode, the Hall thruster 100 is controlled on the basis of a potential difference between two or more physical objects (a measurement result of a satellite potential sensor PS). Thereby, plasma PL can be appropriately generated from the Hall thruster 100 on the basis of the potential difference between the two or more physical objects.

In the charging mitigation mode, a voltage is applied between the cathode electrode 20 and the keeper electrode 30 and a magnetic field is applied to the Hall thruster 100 by the electromagnetic coil 70. Thereby, plasma PL can be generated more efficiently.

In the charging mitigation mode, the working gas is supplied from the first gas supply pipe 51 to the Hall thruster 100. Thereby, for example, by increasing the flow rate of the working gas from the first gas supply pipe 51, the density of the plasma PL generated by the cathode electrode 20 can be improved or the generation of charge exchange ions can be promoted.

In the charging mitigation mode, working gas is supplied from both the first gas supply pipe 51 and the second gas supply pipe 52 to the Hall thruster 100 in parallel. Thereby, the plasma PL can be generated more efficiently.

The Hall thruster 100 is mounted on the artificial satellite S. Here, because the plasma PL diffuses heat, the mounting position of the Hall thruster 100 in the artificial satellite S is not considered and the direction and position of the Hall thruster 100 are not restricted.

Also, the technical scope of the present invention is not limited to the above embodiment and various changes can be made within the scope without departing from the subject matter of the present invention.

For example, a method of avoiding an electric discharge due to a potential difference Va between physical objects using the Hall thruster 100 may be used on the ground. For example, it may be applied to a semiconductor manufacturing process. Also, it may be applied for charging mitigation inside of an analytical instrument using an electron beam or an ion beam such as a scanning electron microscope (SEM).

In the charging mitigation mode, there may be no application of a magnetic field by the electromagnetic coil 70 or no supply of working gas from the second gas supply pipe 52 and the power consumption of the Hall thruster 100 in the charging mitigation mode may be minimized.

The charging mitigation device 110 according to the present embodiment includes the Hall thruster 100. The present invention is not limited to this and the charging mitigation device 110 may use not only the Hall thruster 100 but also other electric thrust devices such as ion engines.

Also, as a structure for neutralizing the plasma PL injected from the thruster head 10, for example, a field emission electron source, a thermionic source, or the like may be adopted.

In addition, within the scope without departing from the subject matter of the present invention, it is appropriately possible to replace the components in the above-described embodiment with well-known components and the above-described modified examples may be appropriately combined.

EXPLANATION OF REFERENCES

20 Cathode electrode
30 Keeper electrode
31 Anode electrode
40 First power supply
41 Second power supply
51 First gas supply pipe (first gas supply unit)
52 Second gas supply pipe (second gas supply unit)
100 Hall thruster (electric thruster)
110 Charging mitigation device
D Target object (physical object)
PL Plasma
S Artificial satellite (physical object)
Va Potential difference

What is claimed is:

1. A charging mitigation device for reducing a potential difference between two or more physical objects, the charging mitigation device comprising:
    a Hall thruster configured to generate a plasma,
    wherein the two or more physical objects are covered with the plasma generated by the Hall thruster,
    wherein the Hall thruster includes a cathode electrode, a keeper electrode, and an anode electrode,
    wherein the Hall thruster can perform a charging mitigation mode in which the two or more physical objects are covered with the plasma, and
    wherein, in the charging mitigation mode, the plasma is generated from the Hall thruster in a state in which no voltage is applied between the anode electrode and the cathode electrode and the voltage is continuously applied between the keeper electrode and the cathode electrode.

2. The charging mitigation device according to claim 1, wherein the Hall thruster can switch a mode between a thrust generation mode in which a thrust is generated and the charging mitigation mode in which the two or more physical objects are covered with the plasma, and
    wherein, in the thrust generation mode, after the plasma is ignited by applying a voltage between the keeper electrode and the cathode electrode, the plasma is generated from the Hall thruster in a state in which the application of the voltage between the cathode electrode and the keeper electrode is stopped while the voltage is applied between the anode electrode and the cathode electrode.

3. The charging mitigation device according to claim 2, wherein, in the charging mitigation mode, the Hall thruster is controlled on a basis of the potential difference between the two or more physical objects.

4. The charging mitigation device according to claim 2, wherein, in the charging mitigation mode, a magnetic field is applied to the Hall thruster while the voltage is applied between the cathode electrode and the keeper electrode.

5. The charging mitigation device according to claim 2, further comprising:
    a first gas supply unit configured to supply a working gas to the Hall thruster at a time of an ignition of the plasma in the thrust generation mode; and
    a second gas supply unit configured to supply the working gas to the Hall thruster at the time of the generation of the thrust based on the plasma in the thrust generation mode,
    wherein, in the charging mitigation mode, the working gas is supplied from the first gas supply unit to the Hall thruster.

6. The charging mitigation device according to claim 5, wherein, in the charging mitigation mode, the working gas is supplied from both the first gas supply unit and the second gas supply unit to the Hall thruster in parallel.

7. The charging mitigation device according to claim 1, wherein one of the two or more physical objects is an artificial satellite on which the electric thruster is mounted.

8. An electric discharge avoidance method of avoiding an electric discharge due to a potential difference between two or more physical objects, the method comprising:
    using the charging mitigation device according to claim 1 and covering the two or more physical objects with the plasma generated from the Hall thruster.

* * * * *